Patented July 22, 1941

2,250,406

UNITED STATES PATENT OFFICE 2,250,406

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application June 27, 1940, Serial No. 342,719

11 Claims. (Cl. 252—342)

This invention relates primarily to the resolution of petroleum emulsions.

One object of our invention is to provide a novel process for resolving petroleum emulsions of the water-in-oil type, that are commonly referred to as "cut-oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

The material or composition of matter which we prefer to use as the demulsifier of our process, can be produced by reacting a polybasic carboxy acid or its functional equivalent, such as the anhydride, and more particularly phthalic anhydride, with products of the kind derivable by an acylation reaction between a ricinoleic acid body and an acylation-reactive amine of the type:

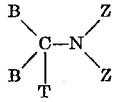

in which B is selected from the class consisting of hydroxy hydrocarbon radicals, ether-type oxyhydrocarbon radicals, and hydroxylated ether-type oxyhydrocarbon radicals; T may be selected from the class consisting of hydrogen atoms, alkyl radicals, and radicals of the kind exemplified by B; and Z' represents a member of the class consisting of hydrogen atoms, hydrocarbon radicals, oxyhydrocarbon radicals, and radicals derived by removal of an alpha hydrogen atom from a carboxy acid ester.

Although such compounds may be obtained in various ways, obviously they are most readily obtainable by first preparing the acylation reaction product of the kind described, for instance, the product obtained by reaction between ricinoleic acid and tris(hydroxymethyl) aminomethane or a homologue or analogue thereof. Thus, reactions of the kind just referred to, i. e., intended to produce an intermediate product, are concerned with the introduction of an acyl radical, for example, a ricinoleyl radical into an amine of the kind mentioned. Such acylation may take place by virtue of an amidification reaction, or by virtue of an esterification reaction. For the sake of convenience, in the hereto appended claims, both types of reactions, amidification and esterification, will be referred to as acylation reactions. In other words, reference to an acylation reaction is not intended to differentiate between whether an esterification reaction takes place, or an amidification reaction takes place, or if both take place.

Ricinoleic acid is most readily available in the form of castor oil, which contains about 85% triricinolein. Instead of ricinoleic acid, one may employ monoricinolein, diricinolein, methyl ricinoleate, ethyl ricinoleate, benzyl ricinoleate, cyclohexyl ricinoleate, etc. Similarly, one may employ polyricinoleic acid, such as diricinoleic acid, triricinoleic acid, and tetraricinoleic acid; or one may employ the dibasic type of diricinoleic acid. Obviously, ricinoleic acid esters can be derived from polyhydric alcohols other than glycerol, for instance, from the various glycols, polyglycols, polyglycerols, methyl glycerol, and the like. Ordinarily, one would employ the cheapest source of the ricinoleic acid radical, which is castor oil. Slightly blown castor oil or the like may be used.

Castor oil can be treated with one mole or two moles of glycerol, or any intermediate quantity, to produce a material consisting largely of diricinolein, monoricinolein, and some triricinolein, with perhaps a small amount of free glycerol. Such material is commonly referred to as superglycerinated castor oil or superglycerinated triricinolein. Such mixture may be considered as a typical ricinoleic acid body.

Having indicated the variety of ricinoleic acid compounds which may be employed, reference will now be made to the type of amine intended for reaction. It is well known that paraffins can be treated with nitric acid, so as to produce nitroparaffins or nitrites. Such nitroparaffins can be treated with aldehydes, particularly aliphatic aldehydes, having four carbon atoms or less, so as to produce nitroparaffins, in which one, two or three hydroxyl alkyl radicals have been introduced, and particularly characterized by the fact that such nitroparaffins may have two or three alkylol groups attached to the same carbon atom. Such nitroparaffins can readily be converted into the corresponding amine. See "Chemical Industries," volume 45, No. 7, pages 664–668, December, 1939. See also "Industrial and Engineering Chemistry," volume 32, No. 1, page 34.

Some known examples of amines of the kind described are:

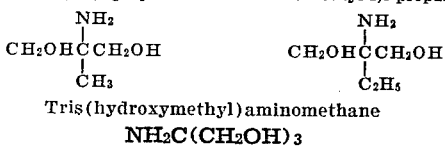

Tris(hydroxymethyl)aminomethane
NH₂C(CH₂OH)₃

Such amines may be indicated by the following formula type:

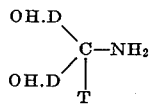

in which D represents a divalent radical, such as the methylene radical, and T may be a hydrogen atom or the same as OH.D, or may represent a monovalent hydrocarbon radical, particularly an alkyl radical. In other words, the nature of T may vary with the particular paraffin selected, and the molal reaction ratio between the nitroparaffin and aldehyde, in the event the paraffin is methane. Needless to say, such reactions between an aldehyde and a nitroparaffin may yield a monohydric alcohol, as distinguished from a nitro-diol or nitro-triol, in the event the paraffin is methane. Such monohydroxylated compound can be converted into an alkylolamine. Such alkylolamine, as, for example, 2-amino-1-butanol, is not herein contemplated for reaction intended to produce condensation products or esterification products of the kind previously described, i. e., the type to be subsequently reacted with phthalic anhydride or hexahydrobenzaldehyde, give very inferior reaction with the nitroparaffins, formaldehyde, acetaldehyde, and butyraldehyde are to be preferred, with formaldehyde being particularly desirable. Cyclic aldehydes, such as benzaldehyde, or hexa hydrobenzaldehyde, give very inferior yields.

Having obtained an amine of the kind above described, which is a primary amine, it can readily be converted into a secondary or tertiary amine by any of the procedures commonly employed for introducing an alkyl or similar monovalent hydrocarbon radical. By means of suitable alkylating agents, one may introduce alkyl groups, aryl radicals, aralkyl radicals, alicyclic radicals, hydroxy hydrocarbon radicals, and the like. Convenient reagents for such reactions include alkyl chlorides, such as butyl chloride, benzyl chloride, phenyl chloride, ethyl bromide, glycerol chlorhydrin, ethylene chlorhydrin, ethylene oxide, propylene oxide, diethyl sulfate, ethyl chloracetate, etc. The result of an alkylation reaction or the equivalent usually results in the formation of an amine salt, such as the amine hydrochloride. The liberation of the free amine depends upon conventional treatment with caustic soda or the like. Treatment with a reactive alkylene oxide, such as ethylene oxide, propylene oxide, and the like does not result in the formation of a salt, and thus in many ways is a more suitable procedure. It should be noted that the hydroxyl, which is part of the radical OH.D, is reactive towards alkylating agents. In some instances perhaps such hydroxyl hydrogen atom is more reactive than in the amino hydrogen atom, and perhaps in other instances not so reactive. The speed of the reactions depends, of course, on the reactants selected and the conditions of the reaction. However, it is to be noted that such reaction may result in the formation of an ether group. This may be illustrated by involving a butyl chloride and a hydroxyl hydrogen atom, thus:

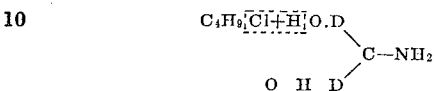

In this instance the radical C₄H₉.O.D. represents an alkoxyalkyl radical, in which D might be obtained from any one of the aldehydes mentioned, for example, acetaldehyde or butyraldehyde; and the butyl radical might be replaced by some other radical, such as the hexyl radical, benzyl radical, cyclohexyl radical, or the like.

If ethylene oxide, propylene oxide, or the like are used to react with the hydrogen atom previously referred to, then the reaction proceeds as follows:

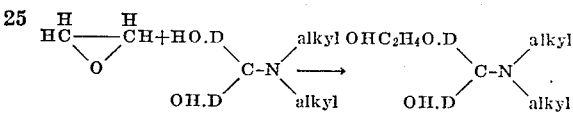

Thus, examining the class of amine compounds in the broadest aspect, they may be rewritten as:

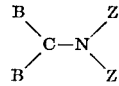

in which B represents a monovalent hydroxy hydrocarbon radical, preferably an alkylol radical, or may be a monovalent oxyhydrocarbon radical, in which the carbon atom chain is interrupted at least once by an oxygen atom, or may be a hydroxylated oxyhydrocarbon radical, which, in addition to having at least one hydroxyl radical, has the carbon atom chain interrupted at least once by an oxygen atom. Reactants such as glycerol monochlorhydrin, or the corresponding chlorhydrins derived from di- or triglycerol, would permit the introduction of radicals containing more than one hydroxyl group, and being interrupted more than once by an oxygen atom. T may be the same as B, or may be a hydrogen atom or any alkyl radical. Z represents a hydrogen atom, or may represent any monovalent hydrocarbon radical, hydroxy hydrocarbon radical, hydroxy oxyhydrocarbon radical characterized by having a hydroxyl radical, and having a carbon atom chain interrupted at least once by oxygen, or a radical derived by hypothetical removal of an alpha hydrogen atom from a carboxy acid ester. It is to be noted that the preferred amine is of the type which contains no aryl radicals, particularly no aryl radicals attached to the amino nitrogen atom, and is preferably of the primary amine type. Due to its availability, the amine which we prefer to employ is tris(hydroxymethyl)aminomethane.

It is obvious, in view of what has been said, that the intermediate acylation products obtained may be of the type in which all acyl radicals present are in the amido form. Compounds may be of the type in which all acyl radicals present are in the ester form. It is also possible to have a series of compounds which exhibit both the amido form and the ester form. Furthermore, it is obvious that an amine of the kind contemplated cannot react with a ricinoleic acid body to give an intermediate acylation product, unless there is present either an alcoholiform hydroxyl, or an amino hydrogen atom. Of course, both forms of reactive hydrogen atoms may be present, a hydrogen of the alcohol radical being referred to as a reactive hydrogen atom. With this in mind, in the hereto appended claims the expression "acylation-reactive amine" is employed to designate such amine, which is reactive in regard to acylation reactions of the kind described.

As is apparent to a person skilled in the art of acylation reactions of the kind referred to, one can select reactants and conditions of reaction, so as to obtain primarily one particular type or primarily another particular type. These variations will be described in some of the following examples:

*Intermediate product, Example 1*

A molecular proportion of tris(hydroxymethyl)methyl dibutylamine is treated with 1 mole of ricinoleic acid and heated until one obtains an ester with the elimination of water. Insofar that the original amine employed contains no replaceable amino hydrogen atom, obviously the only compound obtainable is the ester form.

*Intermediate product, Example 2*

A molecular proportion of tris(hydroxymethyl)methyl butylamine is treated with 1 mole of ricinoleic acid and heated until one obtains an ester with the elimination of water.

*Intermediate product, Example 3*

A molecular proportion of tris(hydroxymethyl)methyl butylamine is treated with one mole of ethyl ricinoleate. The esters preferentially react with replacement of an amino hydrogen atom, rather than an alcoholiform hydroxyl hydrogen atom. Thus, the above reaction can be conducted in a manner to produce the amide in almost complete absence of the ester.

*Intermediate product, Example 4*

One mole of tris(hydroxymethyl)aminomethane is treated with one mole of ricinoleoamide in the conventional manner to eliminate ammonia and form the ricinoleic acid amide of tris(hydroxymethyl)aminomethane.

*Intermediate product, Example 5*

One molecular proportion of tris(hydroxymethyl)aminomethane is treated with two moles of ricinoleic acid until one forms the amide ester. Theoretically one can form a secondary amide, i. e., an amide in which two amino hydrogen atoms attached to the same amino nitrogen atom have been replaced by an acyl radical. However, the introduction of the second amide group attached to the same amino nitrogen is rather difficult to obtain under ordinary conditions of reaction; and thus actually one introduces the second acyl group in the ester form.

*Intermediate product, Example 6*

Tris(butyloxymethyl)aminomethane is treated with one mole of ricinoleic acid to form the corresponding amide of the following formula:

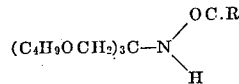

in which OC.R represents the acyl radical derived from ricinoleic acid. If a slightly additional amount of ricinoleic acid is employed, and if conditions producing acylation are raised to a point just short of decomposition temperature and reaction is continued for a long while, one obtains a minor proportion of the secondary amide of the following composition:

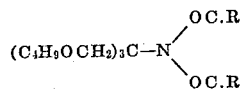

However, other means may be employed to obtain predominantly one type or the other. For instance, if one has the amide or a mixture of the amide and ester type, one can convert the same to the ester type by reaction with a dilute acid. The reason such procedure can be employed is that apparently there is an equilibrium between the amide type and the ester type, especially when heated; and the ester type is basic and dissolves in the acid, thus upsetting the equilibrium. For instance, reference is made to U. S. Patent No. 2,151,788, dated March 28, 1939, to Mauersberger, in which such conversion is illustrated, for instance, in connection with an amide derived from monoethanolamine and oleic acid by use of 85% lactic acid. Such procedure is applicable in connection with the compounds herein contemplated.

Having obtained an esterified amine or an amide or an ester amine of the kind above described, or a mixture of such compounds, the next step is to react the same with a polybasic carboxy acid or its equivalent, such as an anhydride, acyl chloride, or the like. Suitable polybasic carboxy acids include phthalic acid, succinic, maleic, fumaric, citric, maleic, adipic, tartaric, glutaric, diphenic, naphthalic, oxalic, pimelic, suberic, azelaic, sebacic, etc. In the following examples we explain in detail how our new composition of matter may be produced:

*Example 1*

The method of reaction for forming said new composition of matter is such as preferably to involve a hydroxyl of an esterified amine, or an ester amide. In other words, the reaction may involve the alcoholiform hydroxyl of the ricinoleyl radical, or may involve a hydroxyl attached to an alkyl radical or the like, such as the hydroxyl of a methylol radical. It is understood, of course, that the reactions may also involve an amino hydrogen atom, if available, i. e., acylation, as well as esterification, may take place.

As intermediate raw materials, one may employ any of the intermediate products previously described. Our preference is to use a product of the kind described under the heading, "Intermediate product, Example 1," above. Phthalic anhydride is added to such material in such proportion that one employs one mole of the anhydride for each ricinoleyl radical present. If desired, an increased amount of phthalic anhydride may be employed. For instance, one may employ two moles of phthalic anhydride instead of one mole. The mixture of the materials just described, i. e., the intermediate raw material and phthalic anhydride in predetermined proportions, are added at a temperature of approximately 140–180° C. until all free phthalic anhydride has disappeared. At this point one has formed a compound characterized by the fact that there is one free phthalic acid carboxyl present for each mole of phthalic anhydride employed. This stage of reaction is indicated by a determination of the acid value. The nature of the compound obtained depends upon the time of reaction, temperature of reaction, and the molal ratios employed. In other words, one may obtain esterification reactions to a greater degree under one set of circumstances, and perhaps acylation reactions to a greater degree under slightly different circumstances. It is also obvious that one may employ raw materials of the kind described, in which there are no amino hydrogen atoms present; and thus, one obtains no acylation reactions. Under such circumstances the reactions would be strictly of the esterification type.

The final product, which may be a viscous or semi-resinous or sub-resinous material, may be employed as such, or may be diluted with any suitable solvent of the kind hereinafter described.

*Example 2*

Maleic acid is substituted for phthalic anhydride in the previous example.

*Example 3*

Succinic acid is substituted for phthalic anhydride in Example 1.

*Example 4*

An intermediate raw material of the kind described under the heading "Intermediate product, Example 4," preceding, is substituted for Intermediate product, in Examples 1-3 preceding.

*Example 5*

A material of the kind described under the heading "Intermediate product, Example 5," preceding, is substituted as a raw material for Intermediate product, in Examples 1-3 preceding.

*Example 6*

The intermediate material described under the heading "Intermediate product, Example 6", preceding, is substituted for Intermediate product, in Examples 1-3 preceding.

*Example 7*

Types of the kind exemplified by Examples 1-6 preceding are prepared employing amounts of a dibasic acid so that there are residual carboxylic radicals. The acidity of the product is determined by the conventional method of determining an acid number. An amount of triethanolamine is added to neutralize the acidity.

*Example 8*

The same procedure is followed as in Example 7 preceding, except that diethanolamine is employed.

*Example 9*

The same procedure is employed as in Example 7, except that the product is heated so as to convert the triethanolamine salt into an ester by reaction involving the carboxylic hydrogen atom of the dibasic acid and a hydroxyl of the ethanol group of the triethanolamine.

*Example 10*

The same procedure is followed as in Examples 8 and 9 preceding, i. e., diethanolamine is used and one obtains an acylation reaction. However, insofar that diethanolamine is a secondary amine, one probably obtains the mixture of the esterified amine, the amide, and possibly the ester amide.

It is to be understood that the compounds herein contemplated may be manufactured in any suitable manner, and one is not dependent upon following the exact procedure previously outlined. In certain instances the other reactants might be employed, or else reactants of the kind previously described might be combined in some other manner. It is not intended that the hereto appended claims be limited in any manner whatsoever as to the method of manufacture, unless such method is specifically recited.

In such instances where the ricinoleic acid acylation product (an amide, amino or esterified amine) contains at least two hydroxyl radicals, or at least two amino hydrogen atoms, or at least one hydroxyl and at least one amino hydrogen atom, then one is dealing with a polyfunctional or bifunctional compound, and thus reactions involving such types of compounds with a polybasic or dibasic acid, such as phthalic anhydride, will produce a sub-resinous or a semi-resinous type of material. Compare analogous reactions involving glycerol or glycol or monoethanolamine and dibasic or polybasic acids. Our preferred reagent is derived from an amine of the kind which is polyfunctional, and is most desirably of the sub-resinous type; in other words, a compound or mixture of compounds which still represents a liquid or plastic or fusible mass at a temperature at which the final reaction is completed, and is soluble in one or more solvents which may be hydrophile or hydrophobe in nature, including solutions of an acid, such as acetic acid, hydrochloric acid, etc.

Certain obvious functional equivalents suggest themselves and need not be described in detail. For instance, a halogenated ricinoleic acid body might be employed just as advantageously as an ordinary ricinoleic acid body. No advantage would be obtained by the use of more expensive raw material. Similarly, chlorinated phthalic anhydride or acid might be used in place of the less expensive raw material.

It is hardly necessary to indicate that various members of the class previously described are characterized by the presence of a basic or moderately basic amino nitrogen atom, for instance, the ester type. Such basic type of compound naturally can be used as such (without reaction with water); or it can be used in the form of a base, i. e., the compound derived by reaction with water, or in the form of a salt, for instance, the acetate or the salt derived by reaction with a strong mineral acid, such as hydrochloric acid or the like.

We desire to emphasize that the expressions "polybasic carboxy acid" and "dibasic carboxy acid," used in the claims, refer not only to the acids themselves, but to any functional equivalent, such as the anhydride, the acyl chloride, a salt form having at least two free carboxyls, such as monosodium citrate, etc.

It is also understood that in the hereto appended claims the nature of the final product is not limited to the form having a free carboxylic hydrogen, but that such free carboxylic hydrogen may actually be replaced by any functional equivalent of the kind previously described, for instance, a metallic atom, an ammonium radical, an amine radical, such as an amylamine radical, benzylamine radical, ethanolamine radical, diethanolamine radical, triethanolamine radical, a hydrocarbon radical, such as an ethyl, methyl, propyl, or amyl radical, a radical derived from ethylene glycol, glycerol, or the like; a cyclohexyl radical, benzyl radical, etc. All such forms in which such ionizable hydrogen atom equivalent replaces an ionizable hydrogen atom, are obvious functional equivalents.

Attention is directed to the fact that the word "amidification" has been applied to the reaction involving the replacement of an amino hydrogen atom by an acyl radical without conventional limitation to a reaction involving ammonia. The replacement of the amino hydrogen atom of a primary amine or a secondary amine by an acyl radical has been considered as being amidification, rather than the formation of a substituted amide, or the formation of an imide or substituted imide. Such obvious departure from conventional nomenclature has been for purposes of simplicity and to show the similarity between certain reactions. Chemical compounds of the kind herein described for use as demulsifiers are also of value as surface tension depressants in the acidization of calcareous oil-bearing strata by means of strong mineral acid, such as hydrochloric acid.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the new composition of matter previously described, and intended to be used as the demulsifying agent of our process, may be admixed with one or more of the solvents customarily used in connection with conventional demulsifying agents. Moreover, said new material or composition of matter may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the new material or composition of matter employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process, a treating agent or demulsifying agent consisting of the new material or composition of matter above described, is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification.

Having thus described our invention, what we claim as new and desire to secure by Letters Patent is:

1. A process for breaking petroleum emulsions of the water-in-oil type, characterized by subjecting the emulsion to the action of a demulsifier comprising a product of the kind derivable by an acylation reaction between: first, a polybasic carboxy acid; and second, the product of an acylation reaction between a ricinoleic acid body and an acylation reactive amine of the type:

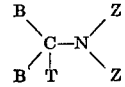

in which B is selected from the class consisting of hydroxy hydrocarbon radicals, ether-type oxyhydrocarbon radicals, and hydroxylated ether-type oxyhydrocarbon radicals; T is selected from the class consisting of hydrogen atoms, alkyl radicals, and radicals of the kind exemplified by B; and Z represents a member of the class consisting of hydrogen atoms, hydrocarbon radicals, oxyhydrocarbon radicals, and radicals derived by removal of an alpha hydrogen atom from a carboxy acid ester.

2. A process for breaking petroleum emulsions of the water-in-oil type, characterized by subjecting the emulsion to the action of a sub-resinous demulsifier comprising a product of the kind derivable by an acylation reaction between: first, a polybasic carboxy acid; and second, the product of an acylation reaction between a ricinoleic acid body and an acylation reactive amine of the type:

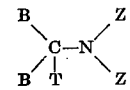

in which B is selected from the class consisting of hydroxy hydrocarbon radicals, ether-type oxyhydrocarbon radicals, and hydroxylated ether-type oxyhydrocarbon radicals; T is selected from the class consisting of hydrogen atoms, alkyl radicals, and radicals of the kind exemplified by B; and Z represents a member of the class consisting of hydrogen atoms, hydrocarbon radicals, oxyhydrocarbon radicals, and radicals derived by removal of an alpha hydrogen atom from a carboxy acid ester.

3. A process for breaking petroleum emulsions of the water-in-oil type, characterized by subjecting the emulsion to the action of a sub-resinous demulsifier comprising a product of the kind derivable by an acylation reaction between: first, a dibasic carboxy acid; and second, the product of an acylation reaction between a ricinoleic acid body and an acylation reactive amine of the type:

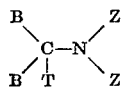

in which B is selected from the class consisting of hydroxy hydrocarbon radicals, ether-type oxyhydrocarbon radicals, and hydroxylated ether-type oxyhydrocarbon radicals; T is selected from the class consisting of hydrogen atoms, alkyl radicals, and radicals of the kind exemplified by B; and Z represents a member of the class consisting of hydrogen atoms, hydrocarbon radicals, oxyhydrocarbon radicals, and radicals derived by removal of an alpha hydrogen atom from a carboxy acid ester.

4. A process for breaking petroleum emulsions of the water-in-oil type, characterized by subjecting the emulsion to the action of a sub-resinous demulsifier comprising a product of the kind derivable by an acylation reaction between: first, maleic anhydride; and second, the product of an acylation reaction between a ricinoleic acid body and an acylation reactive amine of the type:

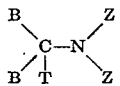

in which B is selected from the class consisting of hydroxy hydrocarbon radicals, ether-type oxyhydrocarbon radicals, and hydroxylated ether-type oxyhydrocarbon radicals; T is selected from the class consisting of hydrogen atoms, alkyl radicals, and radicals of the kind exemplified by B; and Z represents a member of the class consisting of hydrogen atoms, hydrocarbon radicals, oxyhydrocarbon radicals, and radicals derived by removal of an alpha hydrogen atom from a carboxy acid ester.

5. A process for breaking petroleum emulsions of the water-in-oil type, characterized by subjecting the emulsion to the action of a sub-resinous demulsifier comprising a product of the kind derivable by an acylation reaction between: first, oxalic acid; and second, the product of an acylation reaction between a ricinoleic acid body and an acylation reactive amine of the type:

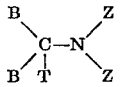

in which B is selected from the class consisting of hydroxy hydrocarbon radicals, ether-type oxyhydrocarbon radicals, and hydroxylated ether-type oxyhydrocarbon radicals; T is selected from the class consisting of hydrogen atoms, alkyl radicals, and radicals of the kind exemplified by B; and Z represents a member of the class consisting of hydrogen atoms, hydrocarbon radicals, oxyhydrocarbon radicals, and radicals derived by removal of an alpha hydrogen atom from a carboxy acid ester.

6. A process for breaking petroleum emulsions of the water-in-oil type, characterized by subjecting the emulsion to the action of a sub-resinous demulsifier comprising a product of the kind derivable by an acylation reaction between: first, phthalic anhydride; and second, the product of an acylation reaction between a ricinoleic acid body and an acylation reactive amine of the type:

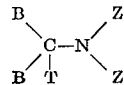

in which B is selected from the class consisting of hydroxy hydrocarbon radicals, ether-type oxyhydrocarbon radicals, and hydroxylated ether-type oxyhydrocarbon radicals; T is selected from the class consisting of hydrogen atoms, alkyl radicals, and radicals of the kind exemplified by B; and Z represents a member of the class consisting of hydrogen atoms, hydrocarbon radicals, oxyhydrocarbon radicals, and radicals derived by removal of an alpha hydrogen atom from a carboxy acid ester.

7. A process for breaking petroleum emulsions of the water-in-oil type, characterized by subjecting the emulsion to the action of a sub-resinous demulsifier comprising a product of the kind derivable by an acylation reaction between: first, phthalic anhydride; and second, the product of an acylation reaction between a ricinoleic acid body and an acylation reactive amine of the type:

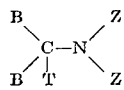

in which B is an alkylol radical; T is selected from the class consisting of hydrogen atoms, alkyl radicals, and radicals of the kind exemplified by B; and Z represents a member of the class consisting of hydrogen atoms, hydrocarbon radicals, oxyhydrocarbon radicals, and radicals derived by removal of an alpha hydrogen atom from a carboxy acid ester.

8. A process for breaking petroleum emulsions of the water-in-oil type, characterized by subjecting the emulsion to the action of a sub-resinous demulsifier comprising a product of the kind derivable by an acylation reaction between: first, phthalic anhydride; and second, the product of an acylated reaction between a ricinoleic acid body and tris(hydroxymethyl)aminomethane.

9. A process for breaking petroleum emulsions of the water-in-oil type, characterized by subjecting the emulsion to the action of a sub-resinous demulsifier comprising a product of the kind derivable by an acylation reaction between: first, phthalic anhydride; and second, the product of an acylated reaction between a ricinoleic acid body and tris(hydroxymethyl)aminomethane; said acylation product being primarily of the amide type.

10. A process for breaking petroleum emulsions of the water-in-oil type, characterized by subjecting the emulsion to the action of a demulsifier comprising a product of the kind derivable by an acylation reaction between: first, phthalic anhydride; and second, the product of an acylated reaction between a ricinoleic acid body and tris(hydroxymethyl)aminomethane; said acylation product being primarily of the ester type.

11. A process for breaking petroleum emulsions of the water-in-oil type, characterized by subjecting the emulsion to the action of a sub-resinous demulsifier comprising a product of the kind derivable by an acylation reaction between: first, phthalic anhydride; and second, the product of an acylated reaction between a ricinoleic acid body and tris(hydroxymethyl)aminomethane; said acylation product being primarily of the ester amide type.

MELVIN DE GROOTE.
BERNHARD KEISER.

CERTIFICATE OF CORRECTION.

Patent No. 2,250,406.  July 22, 1941.

MELVIN DE GROOTE, ET AL.

It is hereby certified that error appears in the printed specification of the above numbered patent requiring correction as follows: Page 2, first column, line 41, beginning with "hexahydrobenzaldehyde" strike out all to and including "yields" in line 47, and insert instead the following -

> the like. Of various aldehydes employed for reaction with the nitroparaffins, formaldehyde, acetaldehyde, and butyraldehyde are to be preferred, with formaldehyde being particularly desirable. Cyclic aldehydes, such as benzaldehyde, or hexahydrobenzaldehyde, give very inferior yields page 6, second column, line 57, claim 10, before the syllable "demulsi-" insert --sub-resinous--; and that the said Letters Patent should be read with this correction therein that the same may conform to the record of the case in the Patent Office.

Signed and sealed this 28th day of October, A.D. 1941.

Henry Van Arsdale,
Acting Commissioner of Patents.

(Seal)